United States Patent [19]
Park, Jr. et al.

[11] 4,375,679
[45] Mar. 1, 1983

[54] HYDROPHONE ACOUSTIC RESPONSE CHAMBER

[75] Inventors: Lawrence D. Park, Jr., Sugarland; William L. Roever, Houston, both of Tex.

[73] Assignee: Shell Oil Company, Houston, Tex.

[21] Appl. No.: 239,092

[22] Filed: Feb. 27, 1981

[51] Int. Cl.³ .......................................... H04R 29/00
[52] U.S. Cl. .................................... 367/13; 73/1 DV
[58] Field of Search ............... 367/13; 73/1 DV, 148

[56] References Cited
U.S. PATENT DOCUMENTS

| | | | |
|---|---|---|---|
| 3,659,255 | 4/1972 | Trott | 367/13 |
| 3,864,664 | 2/1975 | Trott et al. | 367/13 |
| 4,205,394 | 5/1980 | Pickens | 367/13 |
| 4,290,123 | 9/1981 | Pickens | 367/13 |
| 4,320,468 | 3/1982 | Montross | 367/13 |

*Primary Examiner*—Richard A. Farley

[57] ABSTRACT

A method and apparatus for testing individual hydrophones mounted on seismic streamer cables. An irregularly shaped chamber is provided which can be clamped around the cable containing the hydrophone to be tested. An acoustic transducer, such as a loud speaker, provides an acoustic pressure signal inside the chamber. The response of the hydrophone being tested is compared to that of a reference hydrophone mounted within the chamber.

8 Claims, 4 Drawing Figures

$$\frac{\text{FIRST MEAS.} - \text{SECOND MEAS.}}{\text{FIRST MEAS.}} \times 100 = \% \text{ DIFFERENCE}$$

HYDROPHONE ACOUSTIC RESPONSE CHAMBER

BACKGROUND OF THE INVENTION

The present invention relates to devices for testing acoustic transducers, and particularly devices for the in situ testing of hydrophones mounted on seismic streamer cables.

In seismic exploration a long seismic streamer cable, for example, two to three miles long, is towed behind the survey vessel. The cable contains hydrophones which are spaced along the cable for receiving the pressure waves that are created by the seismic source. The seismic cable also has a stress member and suitable electrical leads for transmitting the hydrophones' signals to the exploration vessel. The complete assembly is enclosed in a hollow tube which is filled with a fluid such as kerosene or the like to provide neutral buoyancy for the cable. As can be appreciated, these cables are subject to damage and possible rupture of the tubular member. In case of a rupture, the fluid filling the cable is lost and the cable will sink. In addition, the sea water will invade the cable and short the electrical circuits in the cable.

Recently, developments have been undertaken to provide a semi-rigid foam-filled cable which would replace the liquid-filled cable described above. The foam-filled cable will not sink in case of damage to the outer covering, even including partial damage to the foam filling. In the case of foam-filled cables, the mounting of the hydrophones on the cable, and their operation, is more critical than in the case of the liquid-filled cables. The problem arises from the requirement that the hydrophones be placed on the outside of the cable so that they can receive the pressure waves. This increases the chances of the hydrophones being damaged from handling the cable and while towing it through the water. In both foam-filled and liquid-filled cables, it would be desirable to test the hydrophones for proper operation after they have been installed in the cable. As explained, it is more critical in the case of foam-filled cables that one have the capability of testing the individual hydrophones for proper operation.

In the past, hydrophone testing apparatus has comprised a liquid-filled tank or container either open to the atmosphere or pressurized to simulate a submerged hydrophone condition. In either case the containers are normally limited in size so that it is impossible to place the complete seismic cable in the container and check the hydrophones in place. Thus, the practice has been to check individual hydrophones prior to mounting them in the cable. As explained above, it is desirable in the case of foam-filled cables to check for proper operation of the hydrophones with the hydrophones mounted on the cable.

In addition to the above problems, it is also desirable that one be able to check the hydrophones for proper operation in the field. This requires that the test apparatus be capable of use with the hydrophones mounted on the cable. Also, the test apparatus must be portable and simple to use since a large number of hydrophones must be tested.

SUMMARY OF THE INVENTION

According to the invention, an apparatus is provided for testing individual hydrophones mounted on seismic streamer cables. The apparatus is constructed as a chamber which can be clamped around the cable containing the hydrophone to be tested. A pressure testing signal provides an acoustic pressure signal to which a reference hydrophone and the hydrophone under test will respond. The response of the hydrophone under test is compared to that of the reference hydrophone to make determinations as to polarity, sensitivity and phase over the band of frequencies of interest. The small size of the apparatus plus its ability to test hydrophones after they are installed on the cable permits testing hydrophones in the field, if desired.

BRIEF DESCRIPTION OF THE DRAWINGS

Advantages of the method and apparatus of the invention will become apparent with reference to the detailed description in combination with the drawings, in which.

DETAILED DESCRIPTION OF THE INVENTION

Figure 1A:
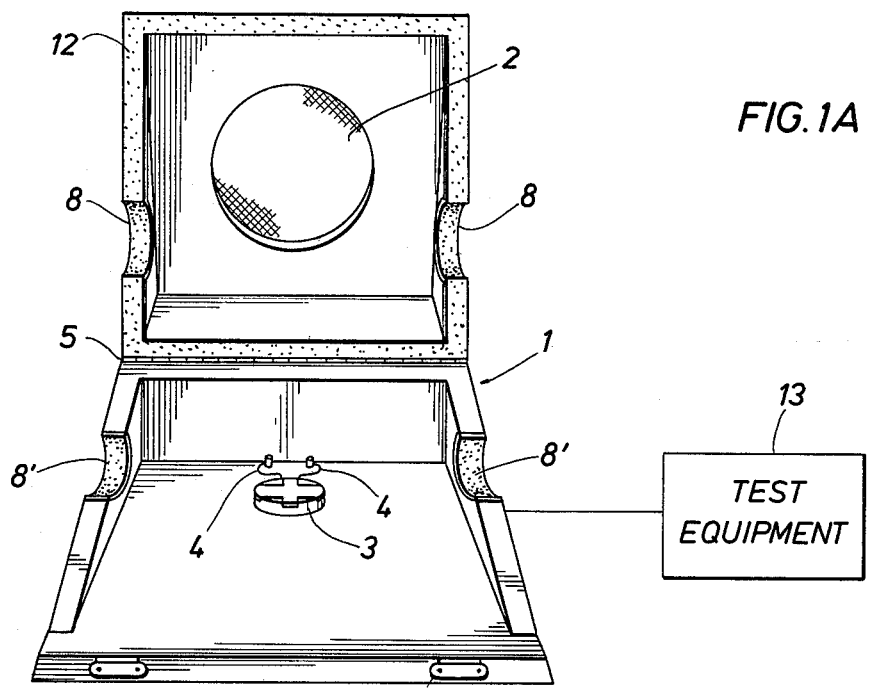
FIGS. 1a, 1b and 1c show views of the hydrophone response test chamber of the invention.

Referring now to FIG. 1a, there is shown a chamber 1 in an open position. An acoustic signal source, such as a loud speaker 2, is attached to chamber 1 such that, when the chamber is in a closed position, the pressure inside of the chamber may be varied in accordance with the signal applied to the source. A pressure transducer 3, utilized as a reference element, is located within chamber 1 with electrical leads 4 connected to the transducer for carrying the electrical response of the pressure sensor to testing equipment 13 external to chamber 1. Pressure transducer 3 is mounted in acoustically soft material for minimizing unwanted signals that are caused by mechanical vibration.

Figure 1B:
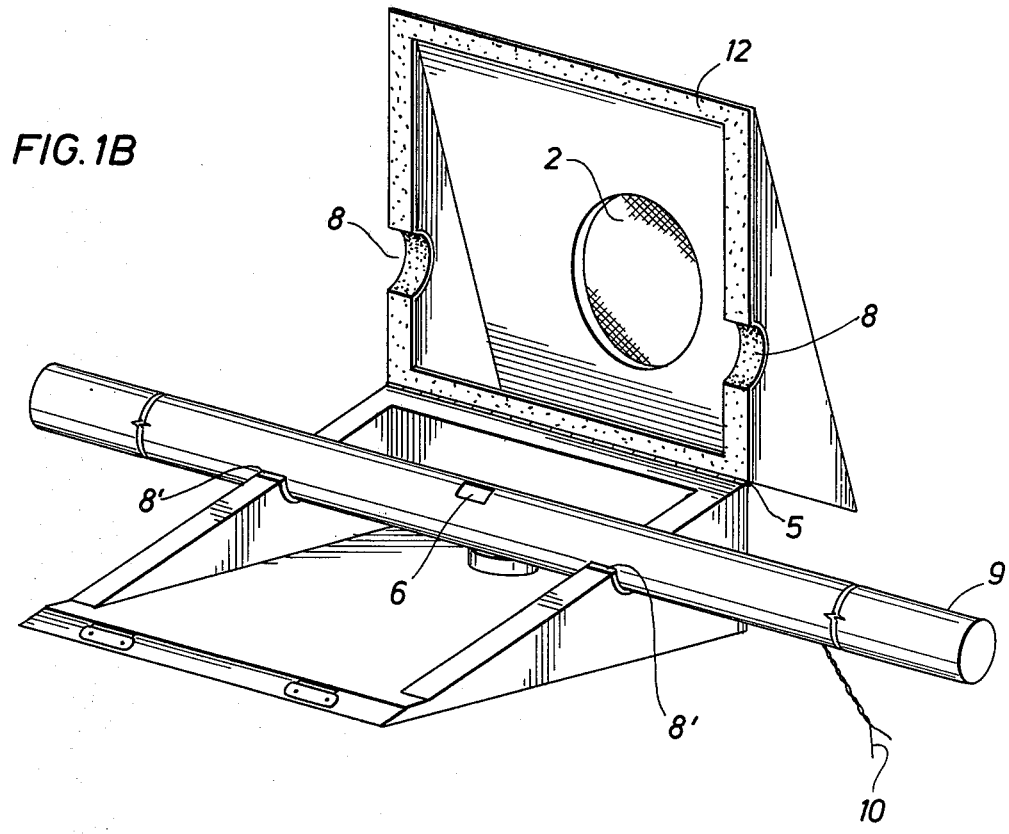
Figure 1C:
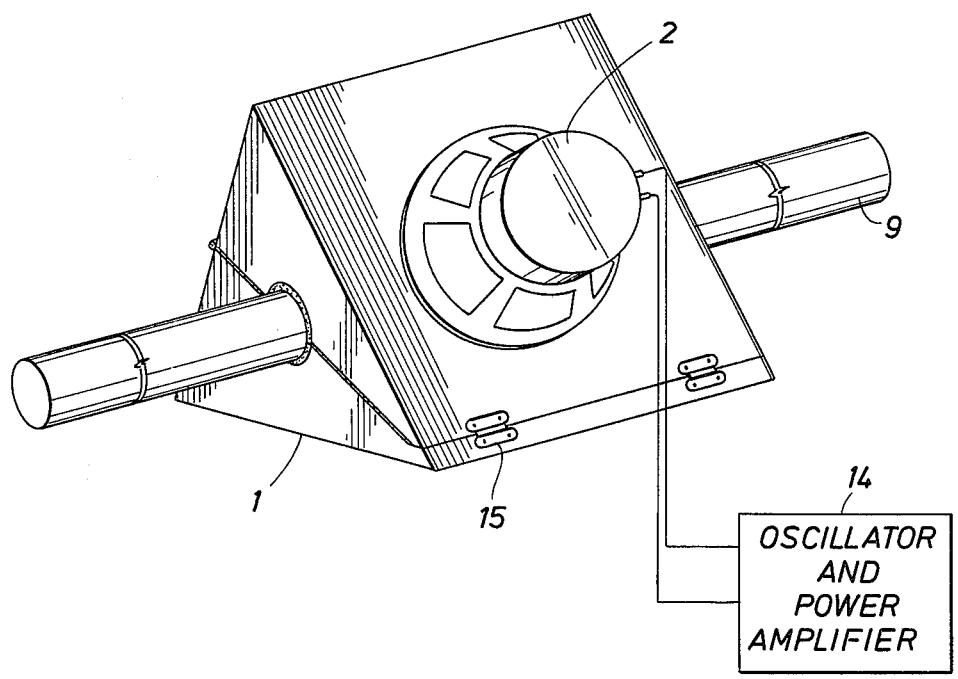

Opening means, facilitated by hinges 5 of FIG. 1b allows the chamber to opened for placement therein of a transducer 6 to be tested. The opening means may include complementary recesses 8 and 8' for supporting a section of seismic cable 9, in the event the transducer to be tested is a hydrophone mounted in a seismic cable. In that event, leads 10 are brought from transducer or hydrophone 6 to testing equipment 13, so that the responses from transducers 3 and 6 may be easily compared. In addition, clamping means 15 as shown in FIG. 1c may be utilized to secure seismic cable section 9 in the chamber 1 such that no movement is allowed between seismic cable 9 and chamber 1.

The opening means, along with cavities 8 and 8', may be covered with sealing means such as foam rubber insulation 12 to form an airtight seal when chamber 1 is in a closed position. This airtight seal insures that the respective transducer responses will be solely due to acoustic waves present wiithin chamber 1, and that no leakage of sound pressure waves in or out of chamber 1 will occur.

The shape of the chamber 1 is dictated by the need for the lack of acceleration forces on transducers 3 and 6 during the testing process and for the avoidance of producing standing waves. An irregularly shaped chamber is provided for this need. It has been found most useful to construct the chamber with a triangular cross section, as shown in FIGS. 1a, 1b and 1c, as this appears to produce the most rigid structure. It is also helpful in this respect to construct the chamber walls out of heavy material, thus reducing vibration forces and chamber resonance. The dimensions of the irregularly shaped chamber are chosen by determining what is the maximum frequency of the acoustic waves for which testing of the transducers is required. The following formula is useful in this regard:

$$d << V_s/f_{max}$$

where $V_s$ equals the velocity of sound in air (approximately 1000 feet per second), $f_{max}$ equals the maximum frequency for which the chamber can be used, and d equals the maximum inside dimension of the chamber in feet. In one test, for instance, at a maximum frequency of 120 hertz, the maximum inside dimension was 10 inches (5/6ths foot).

Oscillator and power amplifier 14 may be utilized to drive loud speaker 2 as shown in FIG. 1c.

The signals from the reference hydrophone 3 and the test hydrophone 6 are analyzed and recorded on suitable test equipment 13. The test equipment may comprise a dual channel oscilloscope on which both signals are displayed. The display could be photographed to provide a record for subsequent analysis. In place of an oscilloscope voltage or frequency measuring instruments may be used to measure the response of the hydrophones to the applied signals. Another alternative would be a phase-amplitude meter to measure the phase and amplitude of the signals for subsequent comparison. A similar system would be the use of a spectrum analyzer for comparing the signals.

The reference hydrophone 3 should be a calibrated hydrophone whose free field response is measured to provide a base for calibrating the response of the hydrophones under test. While a reference hydrophone's response may vary, the response of carefully chosen units will remain constant over a reasonable time. These variations, particularly that of temperature, can be minimized by selecting a hydrophone having similar characteristics to the hydrophone being tested.

The frequency range over which the hydrophone is to be tested determines the size of the chamber. Once the frequency is selected and the chamber's size determined, a suitable power amplifier can be selected. For low frequencies DC-coupled amplifiers can be used while above 10 Hertz transformer-coupled amplifiers could be used. Good results have been obtained using a 10-watt DC-coupled amplifier up to 120 Hertz.

Figure 2:
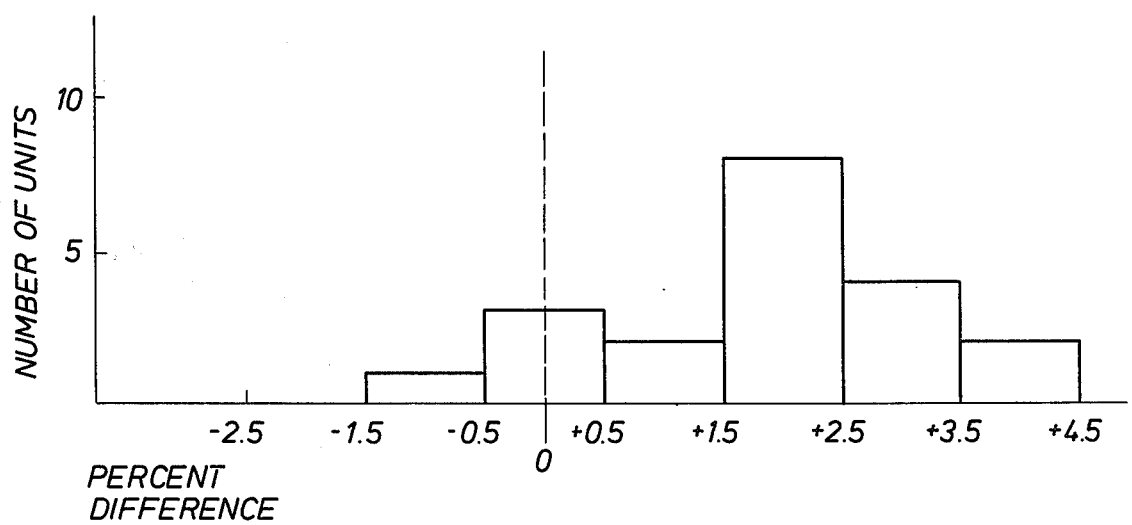
FIG. 2 indicates the degree of measurement reproducibility of the hydrophone response test chamber.

Referring now to FIG. 2, the measurement reproducibility of the hydrophone response test chamber is illustrated. The data displayed represents response tests from 20 individual cable mounted hydrophones, each measured twice. As can be seen, measurements on individual hydrophones can be reproduced to an accuracy of a few percent.

It will be understood that various modifications of this method and apparatus for testing transducers, and particularly testing hydrophones, may occur to those skilled in the art, and it is intended that this invention be limited only by the scope of the appended claims.

We claim:

1. An apparatus for individually testing a seismic transducer in situ in a seismic cable, said seismic transducer being responsive to acoustic pressure changes and said apparatus comprising: a triangularly shaped housing comprising a first housing portion having rigid walls and first and second openings therein, a second housing portion having rigid walls and third and fourth openings therein and means for fastening said first housing portion to said second housing portion such that said first and third openings are aligned and said second and fourth openings are aligned to form two apertures that are sized to accommodate said cable, said first and second housing portions forming a chamber that is sized such that only one of said seismic transducers in said cable is positioned in said chamber when said cable is positioned in said apertures, said chamber having a maximum inner dimension that is less than the quantity determined by dividing the velocity of sound in air by the maximum frequency for which testing is desired; a reference transducer mounted in said chamber; sealing means for providing an airtight seal between said housing and the portion of said cable that is positioned in said apertures; and a signal source for imparting an acoustic pressure test signal of a finite frequency within said chamber.

2. An apparatus as recited in claim 1 wherein said signal source comprises a loud speaker.

3. An apparatus as recited in claim 2, wherein said reference transducer is mounted in means for reducing mechanical vibration.

4. An apparatus for individually testing a seismic transducer in situ in a seismic cable, said seismic transducer being responsive to acoustic pressure changes and said apparatus comprising: a triangularly shaped housing comprising a first housing portion having rigid walls and first and second openings therein, a second housing portion having rigid walls and third and fourth openings therein and means for fastening said first housing portion to said second housing portion such that said first and third openings are aligned and said second and fourth openings are aligned to form two apertures that are sized to accommodate said cable, said first and second housing portions forming a chamber that is sized such that only one of said seismic transducers in said cable is positioned in said chamber when said cable is positioned in said apertures, said chamber having a maximum inner dimension that is less than the quantity determined by dividing the velocity of sound in air by the maximum frequency for which testing is desired; a reference transducer mounted in said chamber; sealing means for providing an airtight seal between said housing and the portion of said cable that is positioned in said apertures; and a single signal source for imparting an acoustic pressure test signal of a finite frequency within said chamber.

5. An apparatus as recited in claim 4, wherein said signal source comprises a loud speaker.

6. An apparatus as recited in claim 5, wherein said reference transducer is mounted in means for reducing mechanical vibration.

7. An apparatus for individually testing a seismic transducer in situ in a seismic cable, said seismic transducer being responsive to acoustic pressure changes and said apparatus comprising: a triangularly shaped housing comprising a first housing portion having rigid walls and first and second openings therein, a second housing portion having rigid walls and third and fourth openings therein and means for fastening said first housing portion to said second housing portion such that said first and third openings are aligned and said second and fourth openings are aligned to form two apertures that are sized to accommodate said cable, said first and second housing portions forming a chamber that is sized such that only one of said seismic transducers in said cable is positioned in said chamber when said cable is positioned in said apertures, said chamber having a maximum inner dimension that is less than the quantity determined by dividing the velocity of sound in air by the maximum frequency for which testing is desired; a reference transducer mounted in said chamber; sealing means comprising resilient foam material for providing an airtight seal between said housing and the portion of said cable that is positioned in said apertures; and a single loud speaker connected to an oscillator and power amplifier for imparting an acoustic pressure test signal of a finite frequency within said chamber.

8. An apparatus as recited in claim 7, wherein said reference transducer is mounted in means for reducing mechanical vibration.

* * * * *